United States Patent [19]
Cannon

[11] Patent Number: 6,167,348
[45] Date of Patent: Dec. 26, 2000

[54] METHOD AND APPARATUS FOR ASCERTAINING A CHARACTERISTIC OF A GEOLOGICAL FORMATION

[75] Inventor: Darrel E. Cannon, Kingwood, Tex.

[73] Assignee: Schlumberger Technology Corporation, Houston, Tex.

[21] Appl. No.: 09/321,343

[22] Filed: May 27, 1999

[51] Int. Cl.[7] .................................................. G01V 3/38
[52] U.S. Cl. .................................. 702/13; 702/9; 702/10
[58] Field of Search ............................ 702/7, 8, 10, 11, 702/12, 13; 73/152.28, 152.18, 152.19, 152.21; 324/338, 339

[56] References Cited

U.S. PATENT DOCUMENTS

| | | | |
|---|---|---|---|
| 4,817,061 | 3/1989 | Alford et al. | 367/36 |
| 5,017,778 | 5/1991 | Wraight . | |
| 5,235,285 | 8/1993 | Clark et al. . | |
| 5,299,128 | 3/1994 | Antoine et al. | 702/10 |
| 5,339,036 | 8/1994 | Clark et al. . | |
| 5,339,037 | 8/1994 | Bonner et al. . | |
| 5,359,324 | 10/1994 | Clark et al. . | |
| 5,363,931 | 11/1994 | Moriarty . | |
| 5,473,158 | 12/1995 | Holenka et al. . | |
| 5,519,668 | 5/1996 | Montaron | 367/35 |
| 5,767,510 | 6/1998 | Evans . | |

*Primary Examiner*—Donald E. McElheny, Jr.
*Attorney, Agent, or Firm*—John J. Ryberg; Brigitte L. Jeffery

[57] ABSTRACT

A method for ascertaining a characteristic of a geological formation surrounding a wellbore. The method comprises first generating a set of data including azimuthal and radial information. A set of parameters indicative of fluid behavior in the formation is determined for each one of at least two azimuths from the generated data. A tool-specific invasion factor is then determined. The characteristic is then determined from the parameters, the azimuthal information, and the invasion factor.

58 Claims, 8 Drawing Sheets

METHOD AND APPARATUS FOR ASCERTAINING A CHARACTERISTIC OF A GEOLOGICAL FORMATION

BACKGROUND OF THE INVENTION

1. Field of the Invention

This invention pertains generally to exploration and production and, more particularly, to a method and apparatus for ascertaining a characteristic of a geological formation.

2. Description of the Related Art

The characteristics of geological formations is of constant interest in the exploration for and production of subsurface mineral deposits, such as oil and gas. Many characteristics, such as the hydrocarbon volume, porosity, lithology, and permeability of a formation, may be deduced from certain measurable quantities. Among these quantities are the non-invaded resistivity, flushed zone resistivity, and diameter of invasion in a formation. The quantities are typically measured by logging-while-drilling ("LWD") and wireline tools. The tool carries one or more sources that radiate energy into the formation and receivers that sense the result of the radiation. The detectors measure this result and either transmit the data back uphole or temporarily store it downhole. Typically, once uphole, the data is input to one or more formation evaluation models, which are software programs used to evaluate the geological formation from which the data was gathered.

Formation evaluation models classically assume thick beds within the formation that lie normal to the wellbore. These beds are also assumed to be homogeneous not only in composition, but in structure in all azimuths about the wellbore. Logging tools are designed and built with these assumptions as a guide. These assumptions simplify modeling the formations, which is valuable from the perspective of computing resources. However, they limit the accuracy of the results in circumstances where the formation's characteristics deviate from the assumptions.

Formation evaluation models typically give little regard to the side of the borehole tools measure or to whether they are azimuthally focused, because all directions are assumed to be the same. This is not a problem in thick beds with bedding normal to the wellbore, i.e., in situations where the formation structure actually matches the assumptions. But, as the bedding angle increases so that the bed is no longer normal to the wellbore, the information can become quite different from one side of the borehole to the other. Without processing, it is impossible to obtain accurate results when combining focused measurements (e.g., a wireline density measurement) and omni-directional measurements (e.g., a wireline induction resistivity measurement). The focused tool responds to one bed while the non-focused tool responds to the average of multi-beds. The geometrical effects of dip must be removed before meaningful processing can proceed.

Fluid distribution is another area that classical models ignore. In permeable, dipping formations, invasion of drilling fluid is often asymmetric because of gravity slumping of the filtrate. More rigorous two-dimensional interpretation models do include filtrate invasion, but ignore dipping beds and azimuthal variations of the invasion. Azimuthal variations are generally not of concern in vertical wells with bedding normal to the wellbore. However, they become important as beds begin to dip or the well becomes deviated. Such variations can be due to dip and asymmetric filtrate invasion.

Gravity also complicates an evaluation. It segregates invading filtrate from formation fluids if there is a density difference. This is especially pronounced in gas zones with large density contrast. Differential pressure between the mud column and the formation creates the initial invasion, normal to the wellbore. This invasion penetrates the formation only so far before gravity dominates at which point the majority of filtrate begins to flow downward rather than outward. "Down" does not have to mean toward the bottom of the hole; it could mean toward one of the sides of the hole, if that is the down direction of the bedding. The higher the vertical permeability the more obvious this effect. The heavier fluid will puddle at the first impermeable layer. This puddling can appear on wireline logs as an apparent water leg at the base of thick, highly permeable gas zones, even though those zones produced dry gas.

In vertical wells, thin, low permeability layers, which minimize segregation, often mask the effect. If the spacing between layers is less than the resolution of the logging tool, then they will not be detectable. In the case of dipping beds, the segregation effect is more obvious. All of the filtrate that leaves the well eventually migrates down dip, even the filtrate that leaves on the up-dip side of the wellbore. This increases the depth of invasion in one direction, making it more obvious on deeper reading logging tools and it creates azimuthal variations of fluids.

Thus, formation evaluations of deviated wells and wells with dipping beds are a challenge, especially with gas reservoirs. Log responses in these wells are often considered "unexplainable." Asymmetry, fluid distribution, and gravity contribute greatly to this problem because of the assumptions classical, one-dimensional and two-dimensional formation evaluation models embody. Even calibration of logs to core can be difficult because of the dramatic changes from level to level asymmetry can cause.

The present invention is directed to resolving one or all of the problems mentioned above.

SUMMARY OF THE INVENTION

A method for ascertaining a characteristic of a geological formation surrounding a wellbore. The method comprises first generating a set of data including azimuthal and radial information. A set of parameters indicative of fluid behavior in the formation is determined for each one of at least two azimuths from the generated data. A tool-specific invasion factor is then determined. The characteristic is then determined from the parameters, the azimuthal information, and the invasion factor.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION OF THE INVENTION

Figure 1:
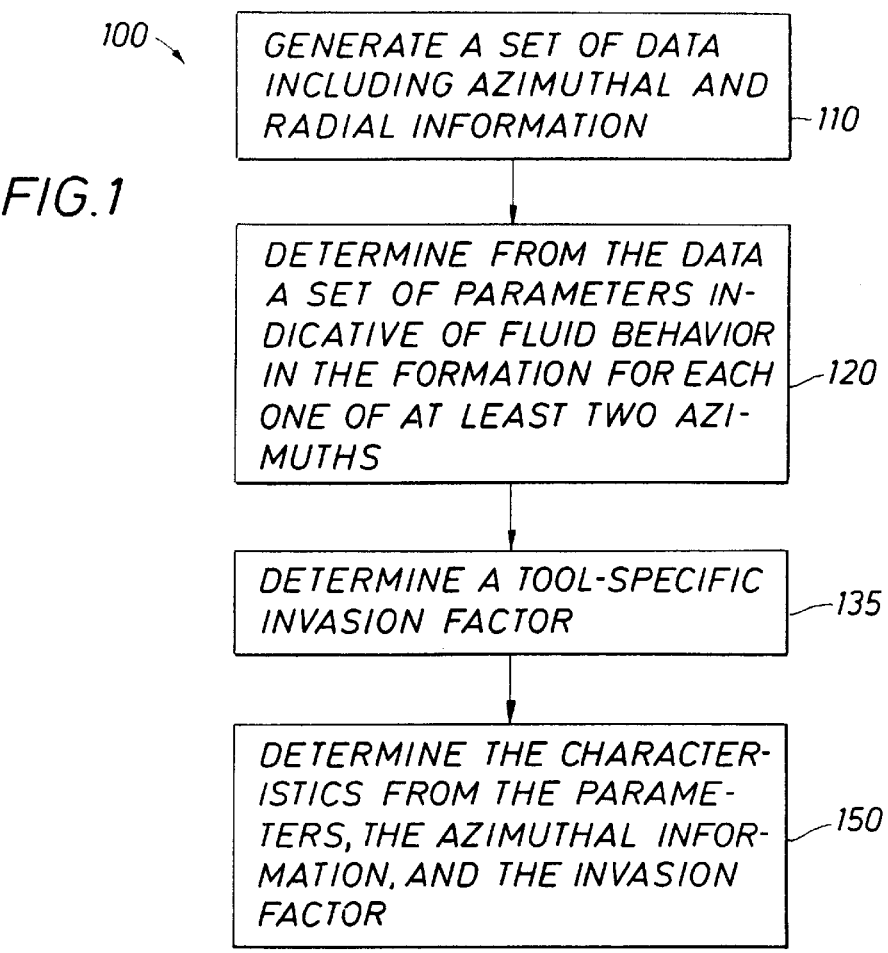
FIG. 1 illustrates one particular embodiment of a method practiced in accordance with the present invention.

FIG. 1 illustrates a method 100 performed in accordance with the present invention. The method 100 is a method for ascertaining a characteristic of a geological formation surrounding a wellbore. Generally speaking, azimuthal and radial data are combined to determine accurate values for characteristics such as porosity, water saturation, and mineralogy.

Referring now to FIG. 1, the method 100 begins in step 110 by generating a set of data including azimuthal and radial information. In one particular embodiment, discussed more fully below, this information is obtained by rotating a LWD tool through the wellbore in the zone of interest within the geological formation. The tool includes azimuthal density and neutron sources and a resistivity source, and appropriate receivers. The density and neutron sources and receivers generate density ($\rho_B$) and porosity ($\phi_N$) data. The resistivity at the bit source generates resistivity data. The data resulting from the tool's measurements are transmitted back uphole for further processing.

However, the invention is not so limited. Some environments might suggest more or fewer types of sources. Alternative embodiments might also, for instance, contain the following variations:

the tool need not necessarily be mounted to drill string and might simply be dropped into the wellbore during a cessation in drilling activities;

the data resulting from the tool's measurements may be stored for post-processing instead of being transmitted back uphole;

the data might be processed downhole a tool carrying a plurality of each type of source arranged radially about the tool might not need to be rotated; and multiple, separate tools, each carrying only one type of source with appropriate receivers, might be deployed instead of a single tool carrying both.

These and other variations may be employed in various alternative embodiments.

Returning to FIG. 1, the method 100 proceeds to step 120, determining from the data a set of parameters indicative of fluid behavior in the formation for each one of at least two azimuths. Exemplary parameters include, but are not necessarily limited to, non-invaded resistivity (or, true resistivity, $R_t$), a flushed zone resistivity ($R_{xo}$), and diameters of invasion ($D_i$). Exemplary azimuths might include up, down, left, and right, relative to the top of the borehole. This parameter determination may be in real-time or in post-processing. In one particular embodiment, the data are transmitted uphole and input into a computer. The computer is programmed with a formation evaluation model that models the formation in accordance with the steps 120–150. Thus, the step 120, and subsequent steps in the method 100, are performed by a computer and may be embodied in suitable instructions encoded on a computer-readable program storage medium.

The parameters true resistivity ($R_t$), flushed zone resistivity ($R_{xo}$), porosity ($\phi$), and diameter of invasion ($D_i$) are considered exemplary because they are highly indicative of fluids around the wellbore. If invasion is deep, the ring resistivity may added to assist in the determination of $R_t$. The assumption needed to combine these data is that in a geologic zone the values $R_t$ and $R_{xo}$ do not change with azimuth. In the direction of deep invasion, the shallow resistivity measurements—those that are the main contributors to $R_{xo}$—have ample signal with which to work; while deep invasion may overwhelm the deep resistivity measurements used to compute $R_t$. In the shallow invasion direction, there may not be enough flushed zone signal to compute a valid $R_{xo}$, while there will be plenty of signal to compute $R_t$.

This step 120 also admits wide variation. Current technology will generally yield an implementation in which these parameters will be determined for each azimuth separately or simultaneously. However, there are no insurmountable technological barriers to implementing an embodiment wherein all factors for all azimuths are solved simultaneously. All such limitations are practical, such as economics. In one particular embodiment, the parameters true resistivity ($R_t$), flushed zone resistivity ($R_{xo}$), and diameter of invasion ($D_i$) are determined by performing an inversion on a subset of data generated in box 110 using known techniques. More particularly, these parameters are determined by performing an inversion on the data generated by the resistivity at the bit source/receiver combination. The inversion is applied separately to data from up, down, left, and right. Also in this particular embodiment, porosity ($\phi$) is determined from the data generated by the neutron, density receiver/source combinations.

Thus, alternative embodiments may solve for the formation characteristic simultaneously or separately. Other variations might include:

determining whether filtrate invasion varies in azimuth versus depth and, if so, employing a tracking function to choose the direction for the inversion;

choosing the best results from multiple inversions;

assuming that $R_t$ is constant about the wellbore; and assuming the $R_{xo}$ to be constant in a geological bed about wellbore and selecting the $R_{xo}$ from the direction of the deepest invasion for the constant value.

These and other variations may be employed in various alternative embodiments.

Referring again to FIG. 1, the method 100 continues by determining a tool-specific invasion factor as set forth in step 135. An invasion factor describes the fractional volume of invaded zone measured by an individual tool. It can have a value from 1.0 to 0.0, wherein 1.0 denotes a tool measuring only the flushed zone and 0.0 denotes a tool measuring only the uninvaded zone. Thus, the density invasion factor in step 135 is the invasion factor determined for the density measurements and the neutron invasion factor in step 140 is the invasion factor determined for the neutron measurements. Because the invasion factor is tool-specific, the exact nature of the invasion factor will be implementation-specific.

One exemplary invasion factor is a density invasion factor. More particularly, a density invasion factor is determined from a $D_i$ whose density information faithfully represents the geological formation in step 135. Step 120, in one particular embodiment, results in at least two $D_i$s, i.e., one for each azimuth, and one of these is selected for use in determining the density invasion factor. The $D_i$ whose density information most faithfully represents the geological formation is generally preferred. However, as will become apparent to those skilled in the art having the benefit of this disclosure, there may be some circumstances where a $D_i$ resulting from density information less faithful than the most faithful may be desired. The actual technique for determining which density information most faithfully reflects the geological formation's structure is well-known, although its use in this manner is not.

A second exemplary invasion factor is a neutron invasion factor. In one particular embodiment in which diameters of invasion are determined from the generated data, the neutron invasion factor is determined from one of the diameters of invasion having a lesser magnitude. Generally, the smallest $D_i$ is preferred. Again, however, there may be circumstances wherein one of the $D_i$s having a lesser magnitude but not the least may be desired.

Finally, the method 100 concludes by determining the characteristic from the non-invaded resistivity, the flushed zone resistivity, the density data, the neutron data, and the tool-specific invasion factor, as set forth in the step 150.

Figure 2:
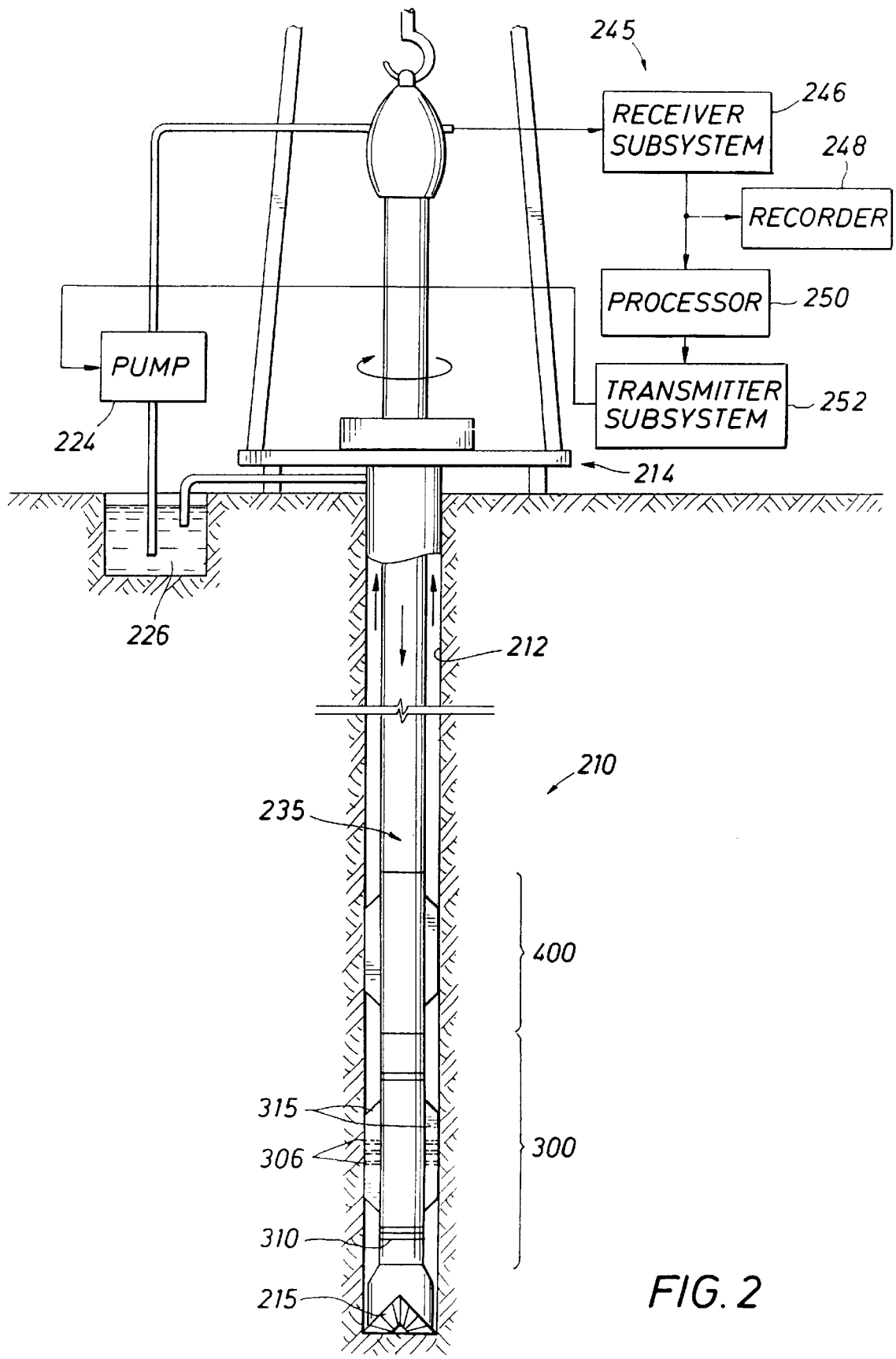
FIG. 2 schematically diagrams, partially in block form, of a LWD apparatus in accordance with an embodiment of the invention, shown attached to a drill string that is suspended in a borehole by a conventional drilling rig.

One Particular Implementation of an Apparatus Operated in Accordance with the Present Invention One particular implementation of the present invention is illustrated in FIG. 2. This particular implementation employs LWD tools offering three-dimensional information that addresses the problem of azimuthally asymmetric formations and fluids in accordance with the present invention. More particularly, this implementation utilizes the RAB™ tool and the ADN™ tool currently employed by Schlumberger Technology Corporation. Both the RAB™ tool 300 and the ADN™ tool 400 in this particular embodiment have focused detectors built into drill collars and, so, are rotated to provide azimuthal information. This RAB™/ADN™ tool combination is especially useful because of the similar rock volumes being measured by both tools.

FIG. 2 illustrates a drill string 210 deployed during an LWD operation in which measurements in an earth borehole 212 are taken with the drill bit 215 and at least some of the drill string 210 in the borehole 212, during drilling, pausing, and/or tripping. Mounted within the drill string 210, preferably near the drill bit 215, is a bottom hole assembly 235. The bottom hole assembly 235 can measure, process, and store information, and communicate with the earth's surface. As used herein, "near the drill bit" means within several drill collar lengths from the drill bit 215. The assembly 235 includes a RAB™ tool 300 and an ADN™ tool 400, which are described further below.

The implementation of FIG. 2 also includes a variety of surface instrumentation 245. The surface instrumentation 245 comprises a receiver subsystem 246, a recorder 248, a processor 250, and a transmitter subsystem 252. The receiver subsystem receives data and other information transmitted uphole from the drill string 210 and forwards it to the recorder 248 and the processor 250. The recorder 248 records the data, which may is post-processed by the processor 250 using the process 100 of FIG. 1. The processor 250 also generates a variety of control signals that control the operation of the pump 224 and are transmitted to the pump 224 via the transmitter subsystem 252.

The RAB™ Tool. The RAB™ tool 300, shown in FIG. 2, consists of three azimuthally focused resistivity buttons measuring three depths of investigation, a deeper measuring focused ring resistivity, and an even deeper bit resistivity. The drilling fluid 226 must be conductive for the RAB™ tool 300 to function properly in this particular embodiment. For each revolution, in this particular embodiment, the azimuthal information is divided into 56 bins with a vertical resolution of approximately 2" (approximately 5.08 cm). The data can be displayed as an electrical image of the formation at up to three different depths of investigation. Various aspects of the structure and operation of the RAB™ tool 300 are disclosed and claimed in the following:

U.S. Pat. No. 5,235,285, entitled "Well Logging Apparatus Having Toroidal Induction Antenna for Measuring, While Drilling, Resistivity of Earth Formations," issued Aug. 10, 1993, to Schlumberger Technology Corporation as the assignee of the inventors Brian Clark et al.;

U.S. Pat. No. 5,339,036, entitled "Logging While Drilling Apparatus With Blade Mounted Electrode for Determining Resistivity of Surrounding Formation," issued Aug. 16, 1994, to Schlumberger Technology Corporation as the assignee of the inventors Brian Clark et al.;

U.S. Pat. No. 5,339,037, entitled "Apparatus and Method for Determining the Resistivity of Earth Formations," issued Aug. 10, 1993, to Schlumberger Technology Corporation as the assignee of the inventors Stephen D. Bonner et al.; and U.S. Pat. No. 5,359,324, entitled "Well Logging Apparatus for Investigating Earth Formations," issued Oct. 25, 1994, to Schlumberger Technology Corporation as the assignee of the inventors Brian Clark et al.

However, in the interest of clarity and completeness, excerpted portions of those references are set forth below.

Referring now to FIG. 2, the button electrodes 306 span a small fraction of the total circumferential locus of the borehole 212 and provide azimuthal resistivity measurements. Also, these button electrodes 306 have a vertical extent that is a small fraction of the vertical dimension of the stabilizer 315 on which they are mounted, and provide relatively high vertical resolution resistivity measurements. In the illustrated embodiment, the surfaces of electrodes 306 have diameters of about 1" (about 2.5 cm.), which is large enough to provide sufficient signal, and small enough to provide the desired vertical and azimuthal measurement resolution. In one implementation, two of the button electrodes 306 are respectively further from the transmitter (not shown) than the other electrode 306. Thus, these farther button electrodes 306 should provide resistivity measurements that tend to be respectively deeper than the measurement obtained from the closer electrode 306.

The ADN™ Tool. Still referring to FIG. 2, the ADN™ tool 400, takes density and neutron measurements. For each revolution, the azimuthally focused density is divided into 4 quadrants that are then expanded to 16 sectors. The neutron measurement is only slightly sensitive to azimuthal variations. Its signal can be divided into four quadrants, but there is little difference between the quadrants. The vertical resolution for both the density and neutron is approximately 1.5' (approximately 45.72 cm).

Various aspects of the structure and operation of the ADN™ tool 400 employed in this particular embodiment are disclosed and claimed in the following:

U.S. Pat. No. 5,363,931, entitled "Drilling Stabilizer," issued Nov. 15, 1994, to Schlumberger Technology Corporation as the assignee of the inventor Keith Moriarty;

U.S. Pat. No. 5,017,778, entitled "Methods and Apparatus for Evaluating Formation Characteristics While Drilling a Borehole Through Earth Formations," issued May 21, 1991, to Schlumberger Technology Corporation as the assignee of the inventor Peter D. Wraight;

U.S. Pat. No. 5,767,510, entitled "Borehole Invariant Porosity Measurement System," issued Jun. 16, 1998, to Schlumberger Technology Corporation as the assignee of the inventor Michael L. Evans; and U.S. Pat. No. 5,473,158, entitled "Logging While Drilling Method and Apparatus for Measuring Formation Characteristics as a Function of Angular Position Within a Borehole," issued Dec. 5, 1995, to Schlumberger Technology Corporation as the assignee of the inventors Jacques Holenka et al.

However, for the sake of clarity and completeness, portions of these patents are excerpted below.

The ADN™ tool 400 includes, to facilitate the measurement of formation density, one set of gamma-radiation detectors and a source of radiation, such as a quantity of cobalt or cesium or any other radioactive substance such energy. An encapsulated chemical source such as those typically used with wireline logging tools might be used. The ADN™ tool 400 also includes, to facilitate neutron porosity measurements, a neutron sensor with a second radiation source cooperatively associated with the neutron sensor. Other elements of the neutron sensor, such as one or more radiation detectors, are cooperatively arranged in the body of the ADN™ tool 400 spatially disposed from the radiation detectors and the radiation source.

Operation of the Apparatus. Measurements by the RAB™ tool 300 and the ADN™ tool 400 are preferably conducted while the borehole 212 is being drilled. The RAB™ tool 300 and the ADN™ tool 400 are rotated in the borehole 212 while the measurements are made. As mentioned above, the measurement may be telemetered to the surface or they may be recorded and stored downhole and read out at the surface after the drill string 210 has been removed from the borehole 212. In this particular embodiment, the data generated by the RAB™ tool 300 and the ADN™ tool 400 are telemetered to the surface, stored in the recorder 248, and post-processed by the processor 250.

Characteristic Determination After Data Acquisition. The parameters selected as most indicative of the fluids around the wellbore in this particular embodiment are true resistivity ($R_t$), flushed zone resistivity ($R_{xo}$) and diameter of invasion ($D_i$). Measurements from the three RAB™ electrodes 306, shown in FIG. 2, are used to compute $R_t$, $R_{xo}$ and $D_i$. The term "flushed zone" describes the zone near the wellbore 212 where all movable fluids have been replaced by filtrate. If invasion is deep, the ring resistivity measurements from the ring electrode 310 are added to assist in the computation of $R_t$. In this particular embodiment, a solver solves for multiple azimuths sequentially, for example, up, down, left and right. The assumption needed to combine these data is that in a geologic zone the values $R_t$ and $R_{xo}$ do not change with azimuth. In the direction of deep invasion, the shallow resistivity measurements—those that are the main contributors to $R_{xo}$—have ample signal with which to work; while deep invasion may overwhelm the deep resistivity measurements used to compute $R_t$. In the shallow invasion direction, there may not be enough flushed zone signal to compute a valid $R_{xo}$, while there will be plenty of signal to compute $R_t$. The results of the inversions are $R_t$, $R_{xo}$, and multiple $D_i$s. One software package capable of performing this analysis is MultiRes™, produced by Schlumberger Technology Corporation, but other software packages may be used.

The values of $D_i$ are converted into $l_i$s (length of invasion from the wall of the wellbore 212) for use with nuclear tools by subtracting the bit size, then dividing by 2. At least two different $l_i$s will be used later with the nuclear data, the shallowest for the neutron and the one in the same azimuthal direction as the density used.

The geometrical offset of dipping beds across the wellbore can be significant. For example, a 70° dipping bed will be offset by over two feet from one side of the hole to the other. Without a 3-D solution, a 2-D plus dip solution can be used. This is done by first resolution matching the curves, then choosing a reference azimuth and depth shifting all curves to that reference. The reference can be a fixed azimuth such as the bottom of the hole or a varying azimuth such as the azimuth of maximum invasion. This correction only removes the geometrical effect of dipping beds from measurements with azimuthal sensitivity. Measurements such as the neutron will be smeared at bed boundaries, though the neutron's shallow depth of investigation minimizes the problem.

Figure 3:
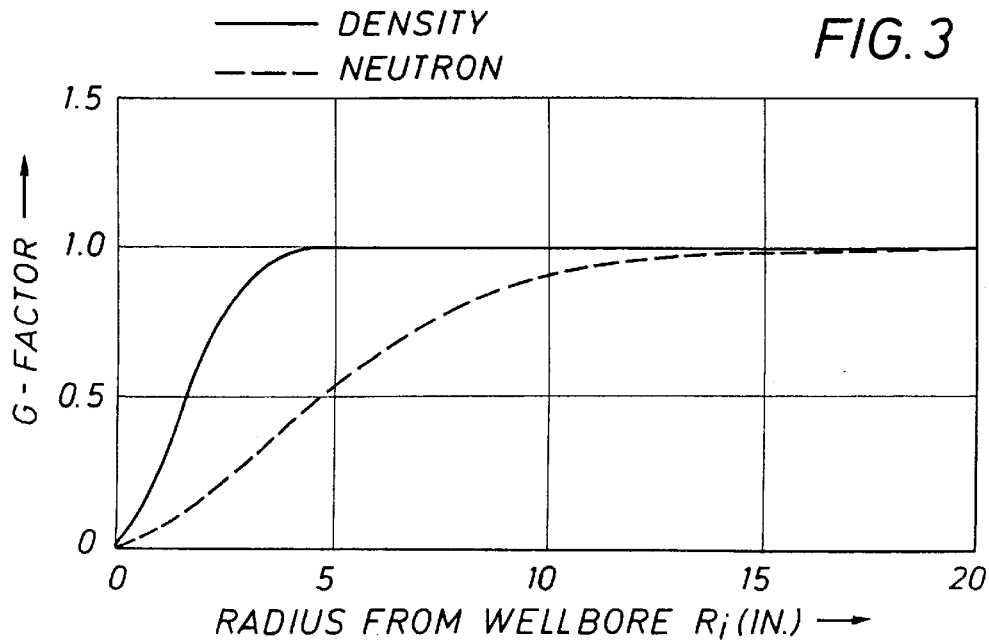
FIG. 3 describes the density and neutron radial response function for fluid invading a gas-filled formation.

The next step of combining data requires knowledge of tool physics. Density measurements are shallow, focused and well behaved. Whatever is in front of the source and detectors is what is measured. The density radial response function described in FIG. 3, for fluid invading a gas-filled formation in the example illustrated, varies little with changes in fluid, formation or porosity. To use the density response function requires knowledge of $l_i$ the from the same azimuth as the density information.

Figure 4A:
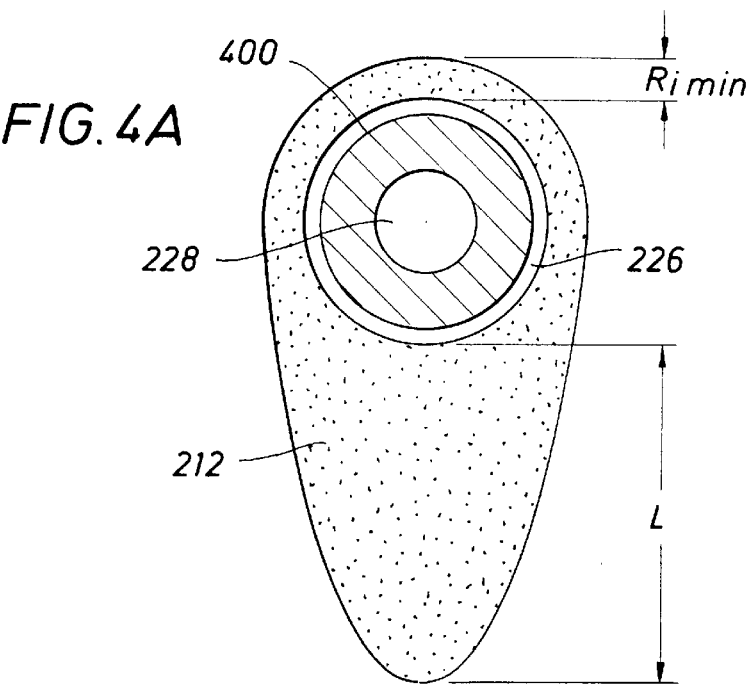
FIGS. 4A–4B describes the neutron's response function when there is a "tear drop" invasion of fluid into a gas reservoir.
Figure 4B:
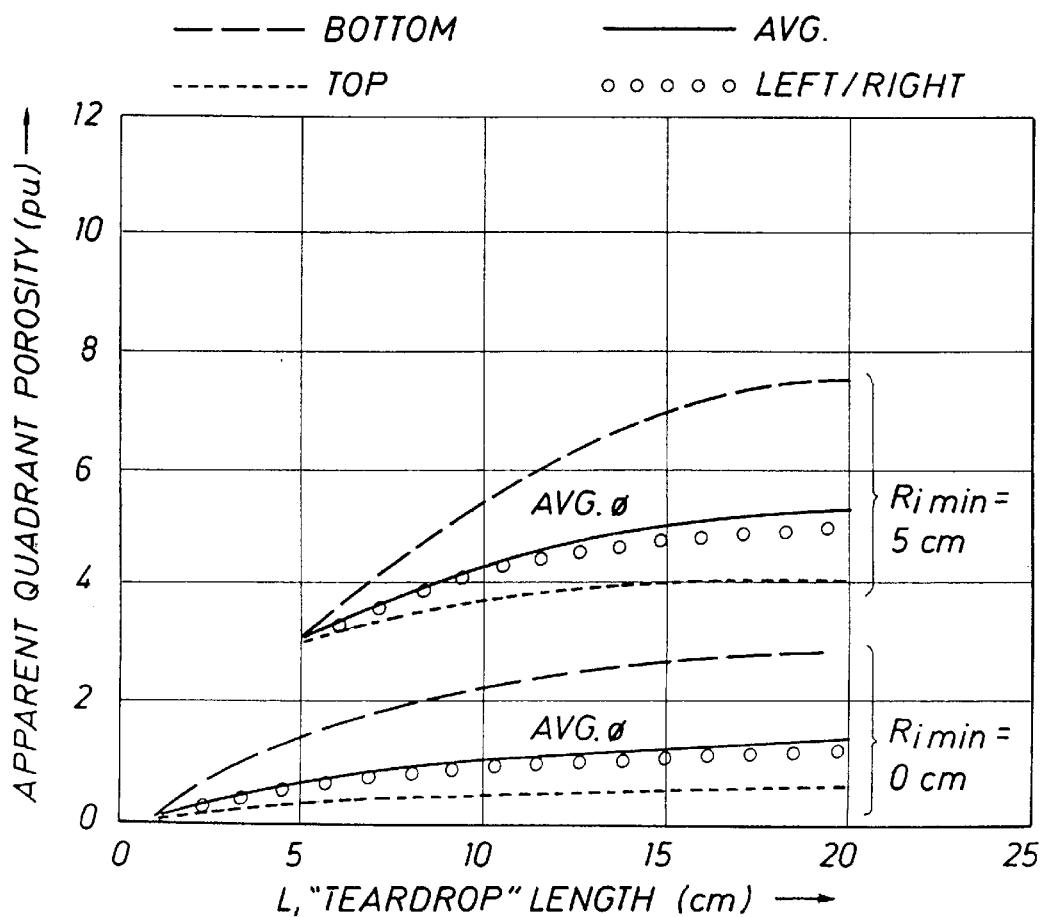

The neutron's radial response is much more complex. A neutron is close to an omni-directional measurement with only slight azimuthal sensitivity; the mud in the drill collar provides a slight back shielding. It responds differently in the presence of gas than it does in the presence of liquids and its azimuthal characteristics are non-intuitive. FIGS. 4A–4B describe the neutron's response function when there is a "tear drop" invasion of fluid into a gas reservoir. More particularly, FIGS. 4A–4B illustrate a modeled neutron response for fluid filtrate invading a gas-filled formation.

FIG. 4A depicts the ADN™ tool 400 in the wellbore 212 with mud 226 circulating therethrough in a cross-sectional view. The quantity $R_{imin}$ is the minimum invasion length and the quantity L is the maximum teardrop, or draped, invasion. The slumped invasion, length L, has little effect on the neutron. The gas closest to the wellbore dominates the neutron. As shown in FIGS. 4A–4B, an invasion difference of 1.97" (5 cm) in the shallow direction has a bigger effect than a 11.8" (30 cm) difference in the draped direction, thus confirming that gas closest to the wellbore dominates the neutron effect. When gas is present, the neutron depth of investigation increases. To use the neutron's radial response function requires a value of $l_i$ that represents the shallowest invasion at a given depth, independent of azimuth.

As described, the neutron and density respond very differently to the presence of gas. The density measurement is shallower (FIG. 3) and is dependent on direction. The neutron is deeper and independent of direction. The result is that in gas wells with varying azimuthal invasion, the density's character will be very invasion dependent and the neutron's character will be almost invasion independent, commonly described as a "lazy neutron."

The final interpretation model uses the appropriate $l_i$s and response functions to partition the nuclear tool responses into a fraction of flushed zone versus non-invaded zone. Next, the $R_t$, $R_{xo}$, the invasion factors, and the density and neutron data are input to a simultaneous solver Elemental Log Analysis (ELAN™), a product and service commercially offered by Schlumberger Technology Corporation, because of the interdependence of the measurements. For example, the volume of gas depends on the porosity and the final porosity depends on the volume of gas.

Figure 5A:
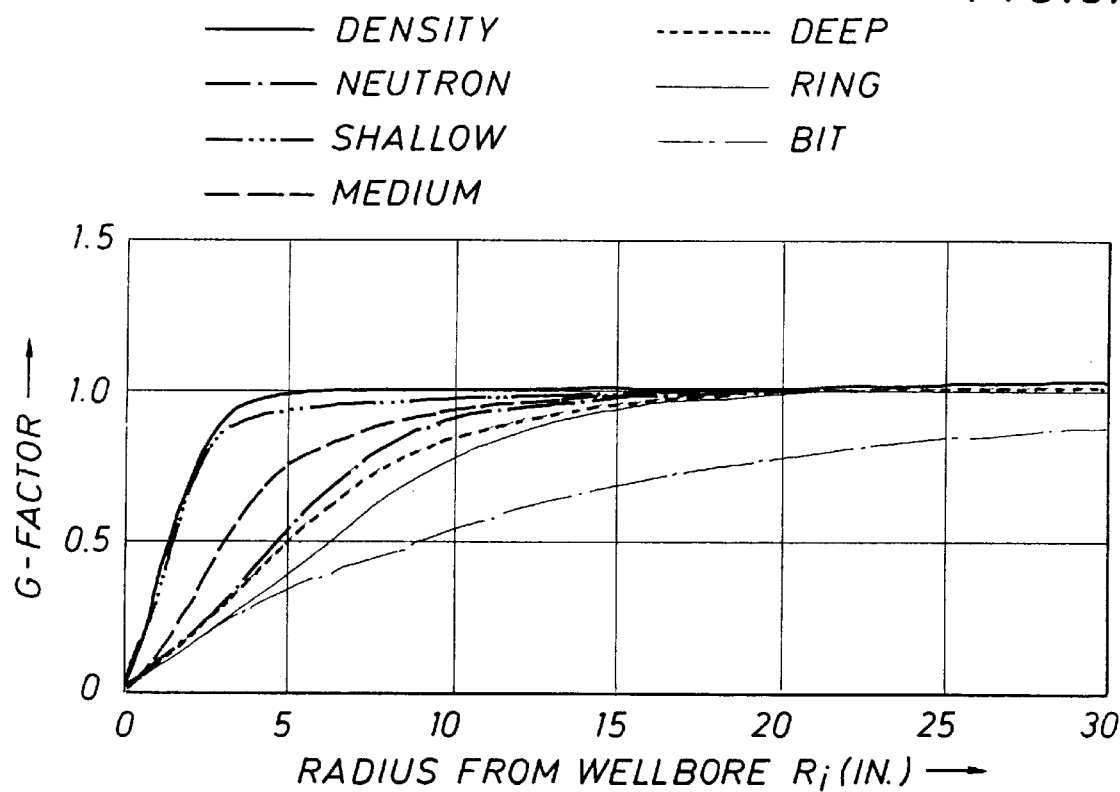
FIG. 5A compares a density and neutron radial response functions and the RAB™ response functions.

For the hydrocarbon saturations corrections to be meaningful, the resistivities used to compute the flushed zone and non-invaded zone saturations must describe the same volume of rock as is measured by the nuclear tools. This is why the ADN™ and RAB™ are so well suited. FIG. 5A compares the radial response functions for the RAB™ and ADN™. The density (round symbols) and the neutron (triangle symbols) are repeated from FIG. 3. The other curves, from left to right, are the RAB™, s shallow button, medium button, deep button, ring and bit resistivities.

Figure 5B:
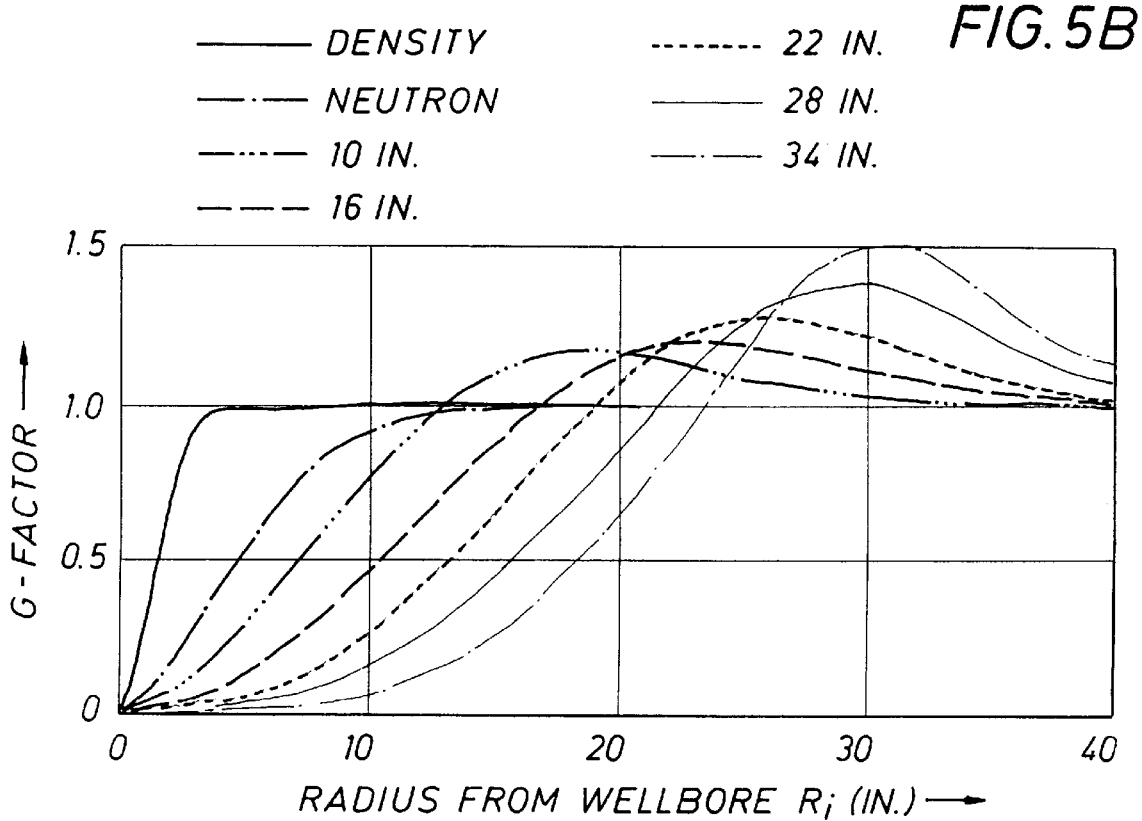
FIG. 5B compares radial response function for the density and neutron compared to the ARC475™ phase resistivities.
Figure 6:
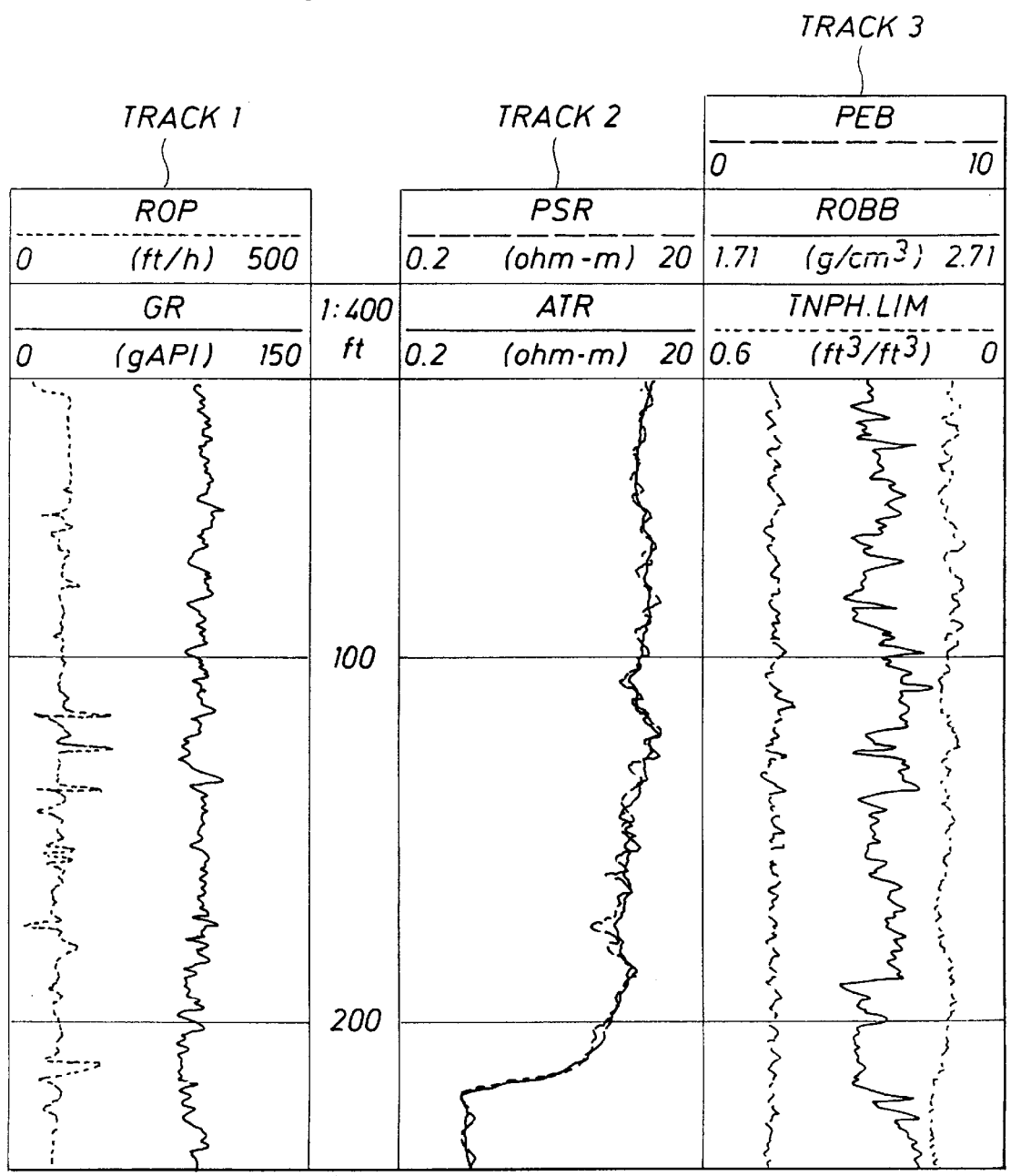
FIG. 6 illustrates selected resistivities.

The RAB™ response functions are environment dependent. The curves shown are for an $R_t/R_{xo}$ ratio of 50. Note, the strong similarity of the shallow button and the density and the fact that the resistivities span the range of both the density and the neutron. FIG. 5B compares the radial response function ARC475™ Array Resistivity Compensated tool phase resistivities with those of the ADN™. Note how much deeper the ARC475™ reads than do either the density or the neutron. The 28" (68.6 cm) phase resistivity has approximately the same radial response as the CDR phase resistivity, which explains the differences in the FIG. 6 and FIG. 7 resistivities. ARC475™ and CDR attenuation resistivities are even deeper yet.

A Working Example

Figure 7:
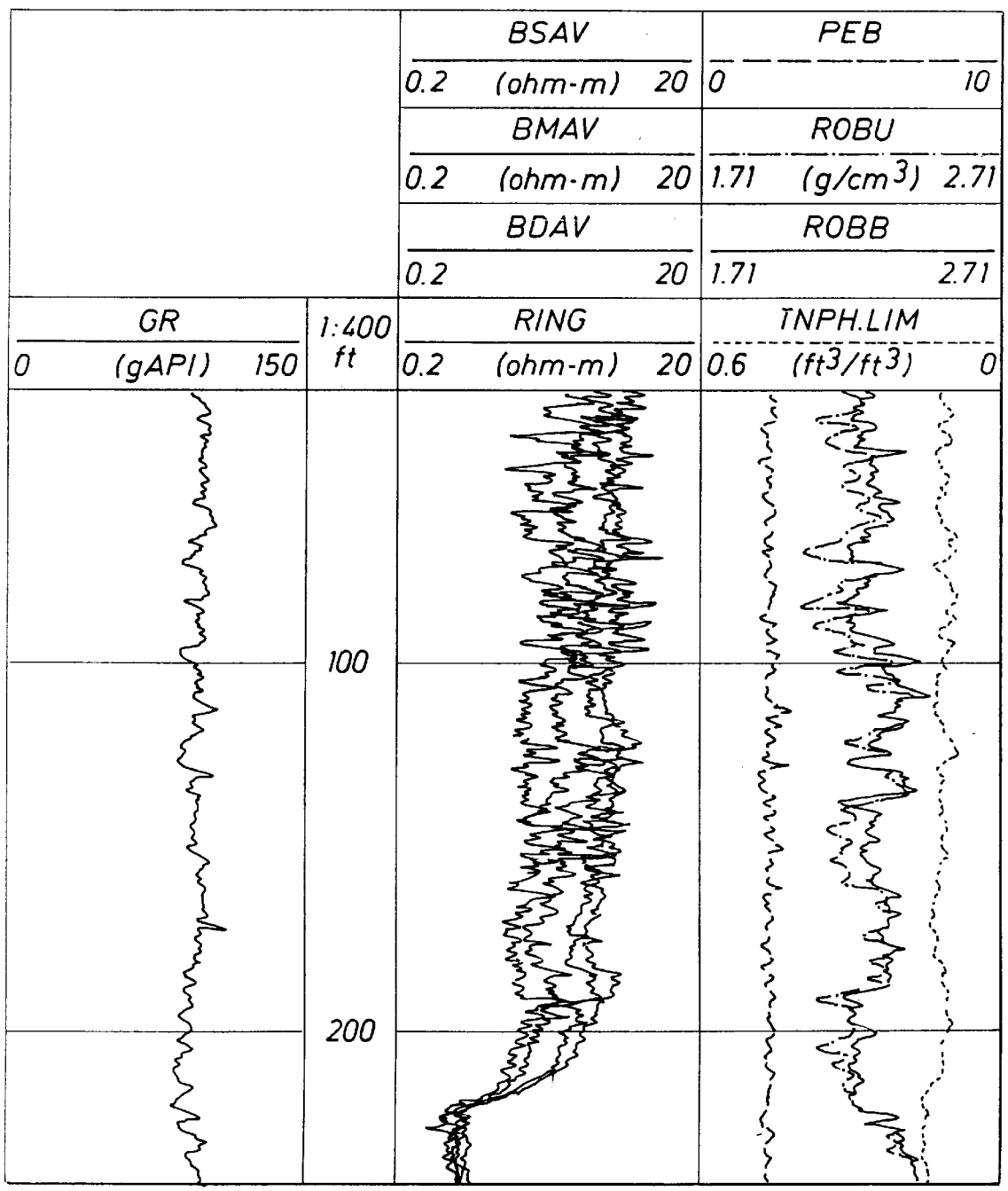
FIG. 7 illustrates another selected resistivity.
Figure 8:
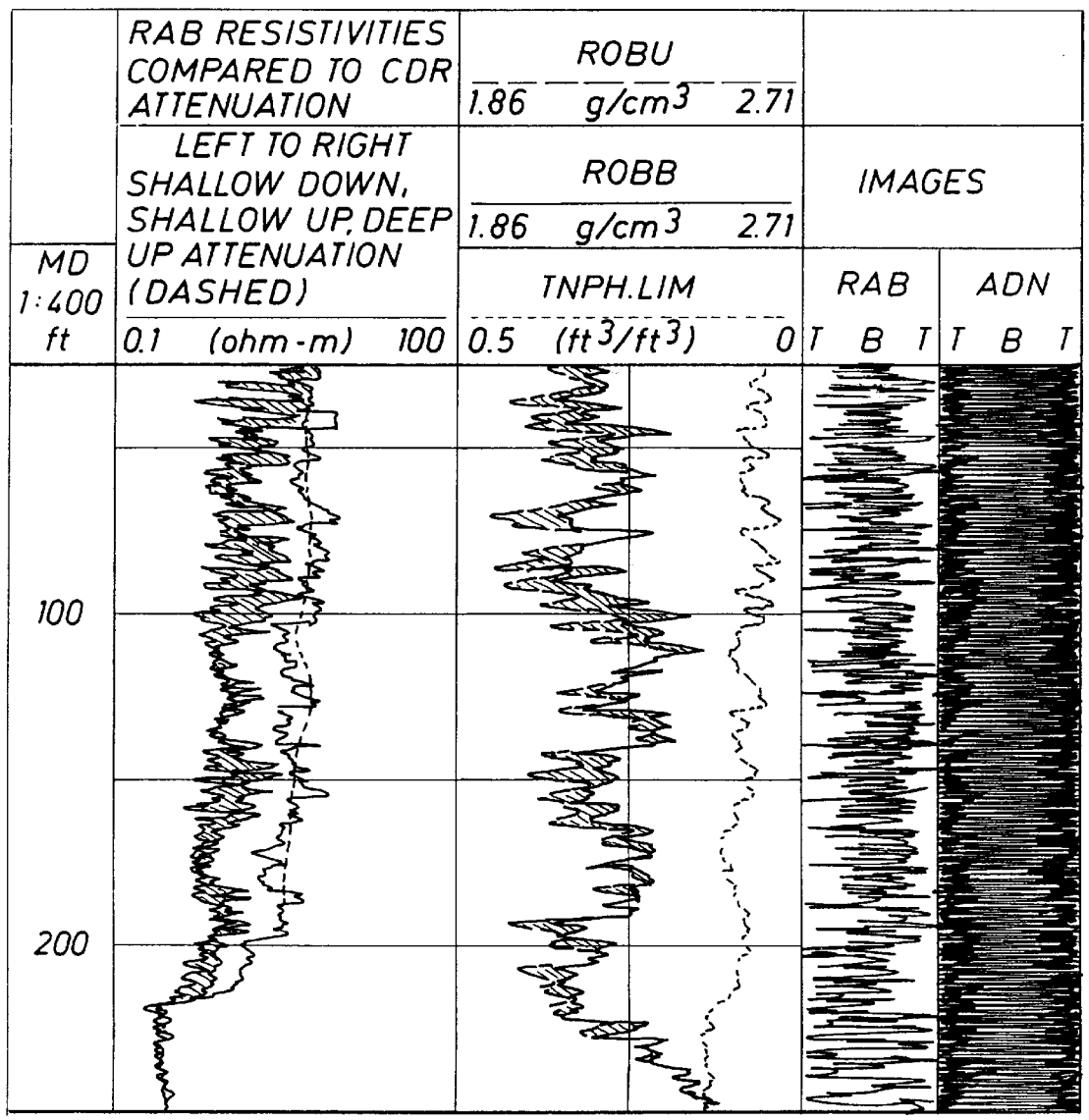
FIG. 8 illustrates selected up and down density data and azimuthal RAB™ and azimuthal density data.
Figure 9:
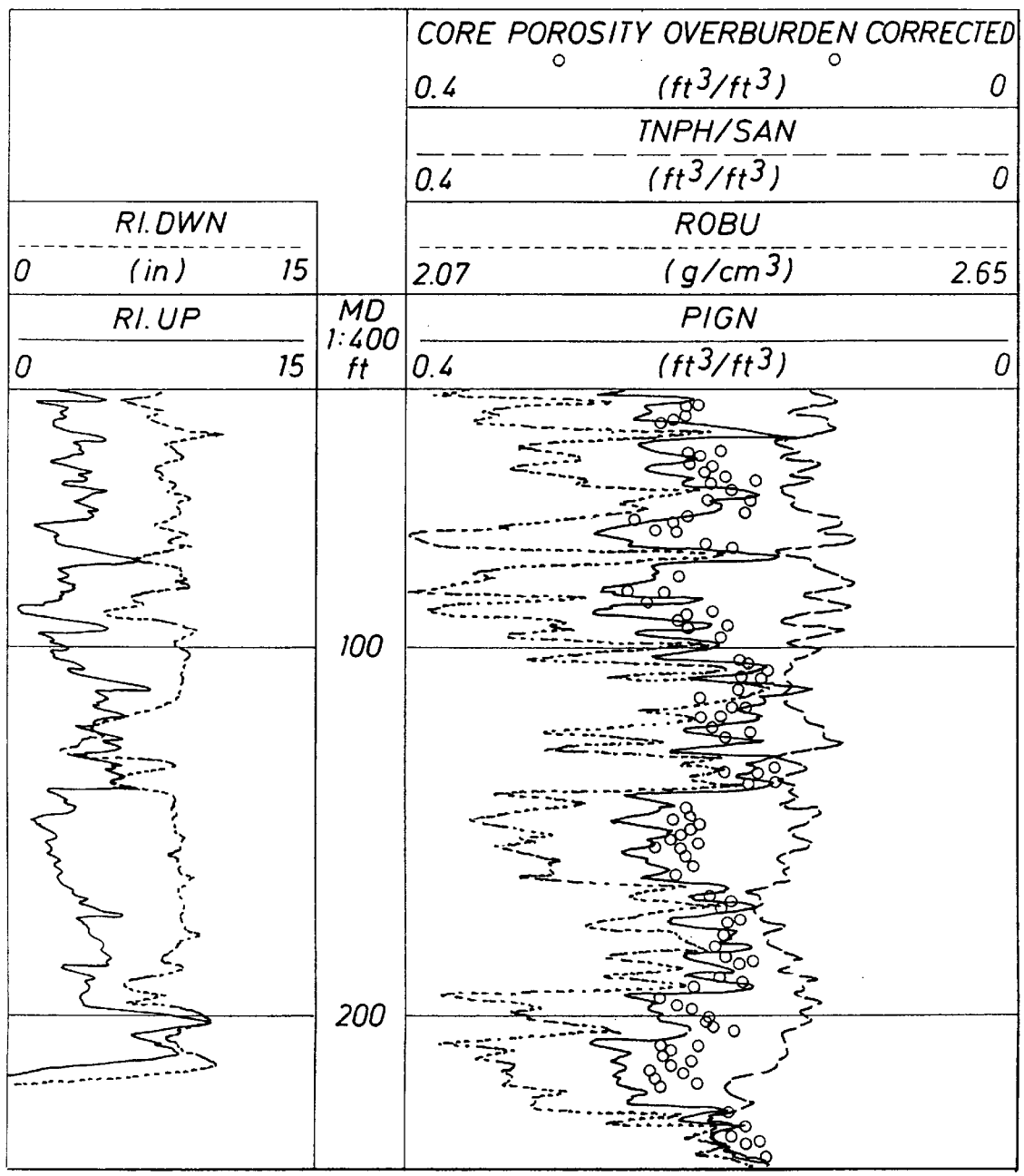
FIG. 9 illustrates one presentation of the final results of a working example.

FIGS. 8–9 illustrate exemplary outputs of the implementation of FIGS. 2–7. The following example is from a gas well drilled at a deviation of 45° through a plastic reservoir with apparent dips of 75° relative to the wellbore. A common suite of logs CDR and ADN™ were run FIG. 6. From left to right are the gamma ray (0–100 api) and ROP (0–1000 ft/hr) in track 1; phase and attenuation (0.2 to 200 ohm-meters) from a CDR tool in track 2; PEF down ("PEB"), ADN™ density down ("ROBB", bottom density 1.71–2.71); ADN™ neutron porosity ("TNPH", 0.6–0 limestone) in track 3. FIG. 7 displays the gamma ray (0–100) in track 1; the average values of the three RAB™ button resistivities plus the ring in track 2; density up (dashed), density down (solid) and neutron in track 3. The RAB™ resistivities are quite different from the CDR resistivities because they have a shallower depth of investigation than any of the CDR resistivities in FIG. 5B. The RAB™ curve separation is due to invasion, invasion in the same volume of rock that affects the ADN™. This invasion is confirmed by the differences in the up and down densities. Invasion slumping (replacement of formation gas separations by filtrate with more replacement on the bottom of the hole than on the top) causes the large density differences.

The invasion is even more complex than what might be concluded from the up and down density data as shown in FIG. 8. From left to right are displayed the RAB™ shallow button down, shallow button up, deep button up and ring resistivities in track 1; a repeat of density and neutron from FIG. 7 in track 2; the RAB™ image; and the ADN™ image. The button presentation is a 2-D representation of the invasion differences in the up-down direction. The left-handed shaded area of the buttons is very comparable to the shaded separation between the up and down density curves. Translated into porosity terms, both separations give the same additional filtrate volumes in the down direction. This confirms the radial response functions in FIG. 5A, which shows the shallow button to have the same radial response as the density under these conditions.

The images go even further by adding a 3-D component to the view of the invasion. Each image represents a flattened cylinder of the borehole wall, beginning with the top of the hole on the left, the bottom in the middle and back to the top on the right. The darker the RAB™ image is the more conductive the formation (filtrate replacing gas). The lighter the ADN™ image is the denser the formation (filtrate replacing gas). Even though the RAB™ has a higher resolution with its 56 bins than the ADN™ with its four quadrants (mapped to 16 sectors), the information is very similar. The invasion has occurred in multiple directions (dark for the RAB™ and light for the ADN™) toward the bottom of the hole, toward the left and the right of hole.

The final results are displayed in FIG. 9. From left to right are the up $l_i$ ($R_i$.up) and the down $l_i(R_i$.dwn) in track 1; the density up (down was left off for clarity), the final computed effective porosity; core porosity at in-situ pressure (dots); and neutron. The porosity scales are from 0.4 to 0. In this computation, the up density was used, so the up $l_i$ was used for both the density and the neutron.

Returning now to FIG. 1, the actions in blocks 120–150 will be automated and performed by a computer, such as the processor 250 in the surface instrumentation 245 shown in FIG. 2. Alternatively, they might be performed downhole by a processor on one of the tools. More particularly, the computer will be programmed by instructions encoded on some form of computer-readable program storage device. The nature of the program storage device is not material to the practice of the invention, and may be magnetic, optical, or paper in nature. The data generated in the box 110 is input to the programmed computer, which then performs the actions set forth in blocks 120–150.

What is claimed:

1. A method for ascertaining a characteristic of a geological formation surrounding a wellbore, the method comprising:

generating a set of data including azimuthal and radial information;

determining from the data a set of parameters indicative of fluid behavior in the formation for each one of at least two azimuths;

determining at least one tool-specific invasion factor; and determining the characteristic from the set of parameters, the azimuthal information, and the invasion factor.

2. The method of claim 1, wherein generating the set of data includes generating one of logging-while-drilling data and wireline data.

3. The method of claim 1, wherein generating the set of data includes:

ascertaining the dip of a bed through which the wellbore passes; and adjusting the data to a common reference.

4. The method of claim 1, wherein generating the data includes rotating a tool in the wellbore.

5. The method of claim 1, wherein generating the data includes generating at least one of resistivity data, density data and neutron porosity data.

6. The method of claim 1, wherein determining the set of parameters indicative of fluid behavior in the formation includes determining at least one of a non-invaded resistivity, a flushed zone resistivity, a porosity, and a diameter of invasion for each one of the at least two azimuths.

7. The method of claim 6, wherein determining the set of parameters indicative of fluid behavior includes inverting the generated set of data.

8. The method of claim 1, wherein determining the set of parameters indicative of fluid behavior includes inverting the set of data.

9. The method of claim 1, wherein determining from the data a set of parameters indicative of fluid behavior in the formation includes:

selecting a reference side of the wellbore; and depth matching data from a second side of the wellbore to the data from the reference side of the wellbore.

10. The method of claim 1, wherein determining from the data a set of parameters indicative of fluid behavior in the formation includes one of:

determining whether a filtrate invasion varies in azimuth versus depth and, if so, employing a tracking function to choose the direction for the inversion; and selecting results from multiple inversions.

11. The method of claim 1, wherein determining from the data a set of parameters indicative of fluid behavior in the formation includes doing so for each azimuth separately.

12. The method of claim 1, wherein determining from the data a set of parameters indicative of fluid behavior in the formation includes assuming that at least one parameter is constant about the wellbore.

13. The method of claim 6, wherein determining from the data the non-invaded resistivity, the flushed zone resistivity, and a diameter of invasion for the formation includes assuming that at least one of the parameters is constant about the wellbore.

14. The method of claim 13, wherein:

the flushed zone resistivity is assumed to be constant about wellbore; and wherein the flushed zone resistivity from the direction of the deepest invasion is selected for the constant value from among a plurality of flushed zone resistivities.

15. The method of claim 1, wherein determining the invasion factor includes:

determining a density invasion factor from one of the diameters of invasion whose density information faithfully represents the geological formation; and determining the neutron invasion factor from the diameter of invasion having the smallest magnitude.

16. The method of claim 6, wherein determining the characteristics includes entering a flushed zone resistivity, a non-invaded resistivity, and an invasion factor for an azimuth into a simultaneous solver.

17. The method of claim 1, wherein the set of parameters includes a diameter of invasion for each azimuth and determining the tool-specific invasion factor includes:

determining a density invasion factor from one of the diameters of invasion whose density information faithfully represents the geological formation; and determining a neutron invasion factor from one of the diameters of invasion having a lesser magnitude.

18. The method of claim 17, wherein determining the density invasion factor from one of the diameters of invasion whose density information faithfully represents the geological formation includes doing so from the diameter of invasion whose density information most faithfully represents the geological formation.

19. The method of claim 17, wherein determining the neutron invasion factor from one of the diameters of invasion having a lesser magnitude includes doing so with the diameter of invasion having the smallest magnitude.

20. The method of claim 1, wherein determining the characteristics includes determining at least one of the hydrocarbon volume, porosity, lithology, and permeability.

21. The method of claim 1, further comprising merging the computational results into a four-dimensional solution.

22. The method of claim 21, wherein the solution addresses at least one of a directional permeability, a relative permeability, and a fractional flow.

23. A computer-readable, program storage medium encoded with instructions that, when executed by a computer, perform a method for ascertaining a characteristic of a geological formation surrounding a wellbore on data including azimuthal and radial information, the method comprising:

determining from the data a set of parameters indicative of fluid behavior in the formation for each one of at least two azimuths;

determining at least one tool-specific invasion factor; and determining the characteristic from the set of parameters, the azimuthal information, and the invasion factor.

24. The computer-readable, program storage medium of claim 23, wherein, in the encoded method, determining the set of parameters indicative of fluid behavior in the formation includes determining at least one of a non-invaded resistivity, a flushed zone resistivity, a porosity, and a diameter of invasion for each one of the at least two azimuths.

25. The computer-readable, program storage medium of claim 24, wherein, in the encoded method, determining the set of parameters indicative of fluid behavior includes inverting the generated set of data.

26. The computer-readable, program storage medium of claim 23, wherein, in the encoded method, determining the set of parameters indicative of fluid behavior includes inverting the set of data.

27. The computer-readable, program storage medium of claim 23, wherein, in the encoded method, determining from the data a set of parameters indicative of fluid behavior in the formation includes:

selecting a reference side of the wellbore; and depth matching data from a second side of the wellbore to the data from the reference side of the wellbore.

28. The computer-readable, program storage medium of claim 23, wherein, in the encoded method, determining from the data a set of parameters indicative of fluid behavior in the formation includes one of:

determining whether a filtrate invasion varies in azimuth versus depth and, if so, employing a tracking function to choose the direction for the inversion; and selecting results from multiple inversions.

29. The computer-readable, program storage medium of claim 23, wherein, in the encoded method, determining from the data a set of parameters indicative of fluid behavior in the formation includes doing so for each azimuth separately.

30. The computer-readable, program storage medium of claim 23, wherein, in the encoded method, determining from the data a set of parameters indicative of fluid behavior in the formation includes assuming that at least one parameter is constant about the wellbore.

31. The computer-readable, program storage medium of claim 24, wherein, in the encoded method, determining from the data the non-invaded resistivity, the flushed zone resistivity, and a diameter of invasion for the formation includes assuming that at least one of the parameters is constant about the wellbore.

32. The computer-readable, program storage medium of claim 31, wherein, in the encoded method:

the flushed zone resistivity is assumed to be constant about wellbore; and wherein, in the encoded method, the flushed zone resistivity from the direction of the deepest invasion is selected for the constant value from among a plurality of flushed zone resistivities.

33. The computer-readable, program storage medium of claim 24, wherein, in the encoded method, determining the invasion factor includes:

determining a density invasion factor from one of the diameters of invasion whose density information faithfully represents the geological formation; and determining the neutron invasion factor from the diameter of invasion having the smallest magnitude.

34. The computer-readable, program storage medium of claim 24, wherein, in the encoded method, determining the characteristics includes entering a flushed zone resistivity, non-invaded resistivity, and an invasion factors for an azimuth into a simultaneous solver.

35. The computer-readable, program storage medium of claim 23, wherein, in the encoded method, the set of parameters includes a diameter of invasion for each azimuth and determining the tool-specific invasion factor includes:

determining a density invasion factor from a of the diameters of invasion whose density information faithfully represents the geological formation; and determining a neutron invasion factor from one of the diameters of invasion having a lesser magnitude.

36. The computer-readable, program storage medium of claim 35, wherein, in the encoded method, determining the density invasion factor from one of the diameters of invasion whose density information faithfully represents the geological formation includes doing so from the diameter of invasion whose density information most faithfully represents the geological formation.

37. The computer-readable, program storage medium of claim 35, wherein, in the encoded method, determining the neutron invasion factor from one of the diameters of invasion having a lesser magnitude includes doing so with the diameter of invasion having the smallest magnitude.

38. The computer-readable, program storage medium of claim 23, wherein, in the encoded method, determining the characteristics includes determining at least one of the hydrocarbon volume, porosity, lithology, and permeability.

39. The computer-readable, program storage medium of claim 23, wherein the encoded method further comprises merging the computational results into a four-dimensional solution.

40. The computer-readable, program storage medium of claim 39, wherein, in the encoded method, the solution addresses at least one of a directional permeability, a relative permeability, and a fractional flow.

41. A computer programmed to perform a method for ascertaining a characteristic of a geological formation surrounding a wellbore on data including azimuthal and radial information, the method comprising:

determining from the data a set of parameters indicative of fluid behavior in the formation for each one of at least two azimuths;

determining at least one tool-specific invasion factor; and determining the characteristic from the set of parameters, the azimuthal information, and the invasion factor.

42. The programmed computer of claim 41, wherein, in the programmed method, determining the set of parameters indicative of fluid behavior in the formation includes determining at least one of a non-invaded resistivity, a flushed zone resistivity, a porosity, and a diameter of invasion for each one of the at least two azimuths.

43. The programmed computer of claim 42, wherein, in the programmed method, determining the set of parameters indicative of fluid behavior includes inverting the generated set of data.

44. The programmed computer of claim 41, wherein, in the programmed method, determining the set of parameters indicative of fluid behavior includes inverting the set of data.

45. The programmed computer of claim 41, wherein, in the programmed method, determining from the data a set of parameters indicative of fluid behavior in the formation includes:

selecting a reference side of the wellbore; and depth matching data from a second side of the wellbore to the data from the reference side of the wellbore.

46. The programmed computer of claim 41, wherein, in the programmed method, determining from the data a set of parameters indicative of fluid behavior in the formation includes one of:

determining whether a filtrate invasion varies in azimuth versus depth and, if so, employing a tracking function to choose the direction for the inversion; and selecting results from multiple inversions.

47. The programmed computer of claim 41, wherein, in the programmed method, determining from the data a set of parameters indicative of fluid behavior in the formation includes doing so for each azimuth separately.

48. The programmed computer of claim 41, wherein, in the programmed method, determining from the data a set of parameters indicative of fluid behavior in the formation includes assuming that at least one parameter is constant about the wellbore.

49. The programmed computer of claim 42, wherein, in the programmed method, determining from the data the non-invaded resistivity, the flushed zone resistivity, and a diameter of invasion for the formation includes assuming that at least one of the parameters is constant about the wellbore.

50. The programmed computer of claim 49, wherein, in the programmed method:

the flushed zone resistivity is assumed to be constant about wellbore; and wherein, in the programmed method, the flushed zone resistivity from the direction of the deepest invasion is selected for the constant value from among a plurality of flushed zone resistivities.

51. The programmed computer of claim 42, wherein, in the programmed method, determining the invasion factor includes:

determining a density invasion factor from one of the diameters of invasion whose density information faithfully represents the geological formation; and determining the neutron invasion factor from the diameter of invasion having the smallest magnitude.

52. The programmed computer of claim 42, wherein, in the programmed method, determining the characteristics includes entering a flushed zone resistivity, non-invaded resistivity, and an invasion factors for an azimuth into a simultaneous solver.

53. The programmed computer of claim 41, wherein, in the programmed method, the set of parameters includes a diameter of invasion for each azimuth and determining the tool-specific invasion factor includes:

determining a density invasion factor from a of the diameters of invasion whose density information faithfully represents the geological formation; and determining a neutron invasion factor from one of the diameters of invasion having a lesser magnitude.

54. The programmed computer of claim 53, wherein, in the programmed method, determining the density invasion factor from one of the diameters of invasion whose density information faithfully represents the geological formation includes doing so from the diameter of invasion whose density information most faithfully represents the geological formation.

55. The programmed computer of claim 53, wherein, in the programmed method, determining the neutron invasion factor from one of the diameters of invasion having a lesser magnitude includes doing so with the diameter of invasion having the smallest magnitude.

56. The programmed computer of claim 41, wherein, in the programmed method, determining the characteristics includes determining at least one of the hydrocarbon volume, porosity, lithology, and permeability.

57. The programmed computer of claim 41, wherein the programmed method further comprises merging the computational results into a four-dimensional solution.

58. The programmed computer of claim 57, wherein, in the programmed method, the solution addresses at least one of a directional permeability, a relative permeability, and a fractional flow.

* * * * *